Feb. 4, 1969
H. DREYER ET AL
3,425,636
CENTRIFUGAL SPREADER APPARATUS
Filed July 14, 1966
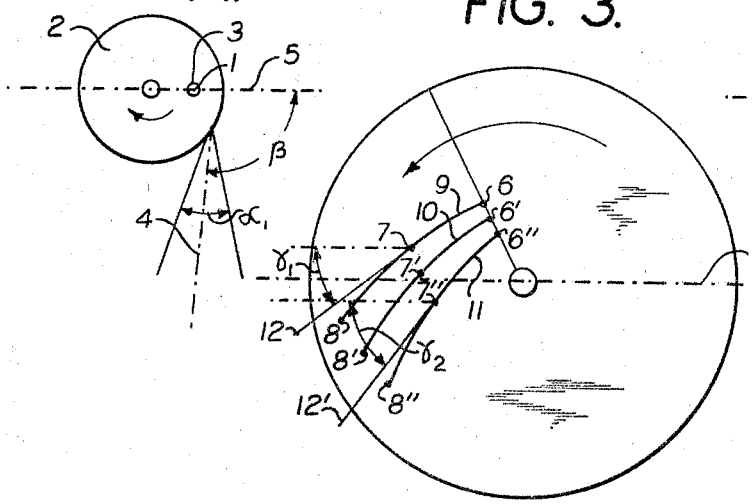
FIG. 1.
FIG. 3.
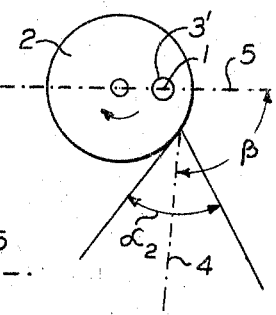
FIG. 2.
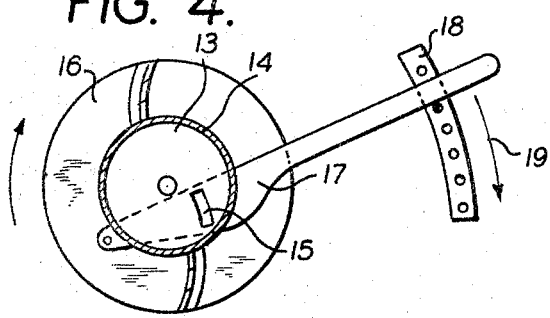
FIG. 4.
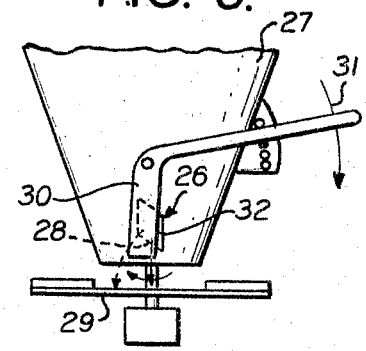
FIG. 6.
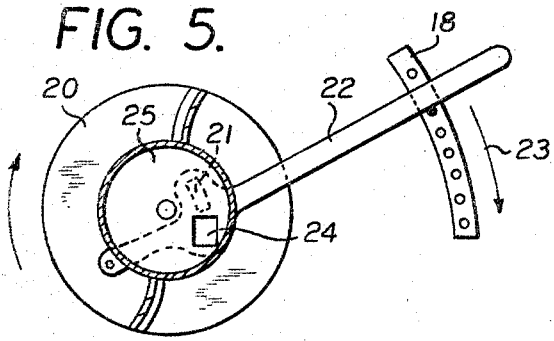
FIG. 5.
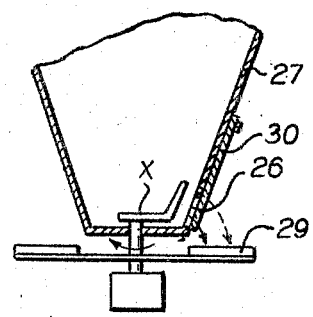
FIG. 7.
INVENTORS
HEINZ DREYER
ERNST HERBECK
BY
Burgess, Dinklage + Sprung
ATTORNEYS.

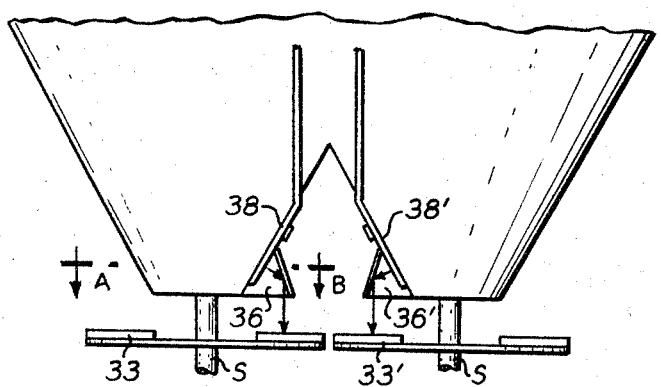
FIG. 8.
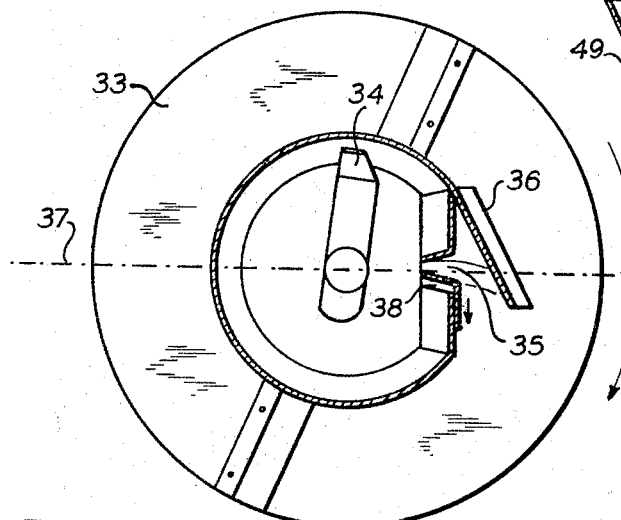
FIG. 9.
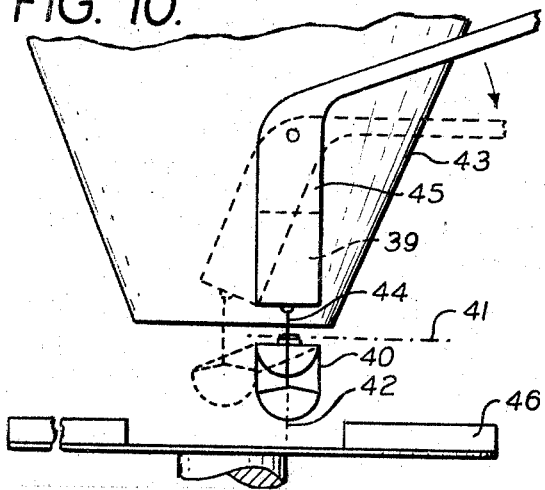
FIG. 10.
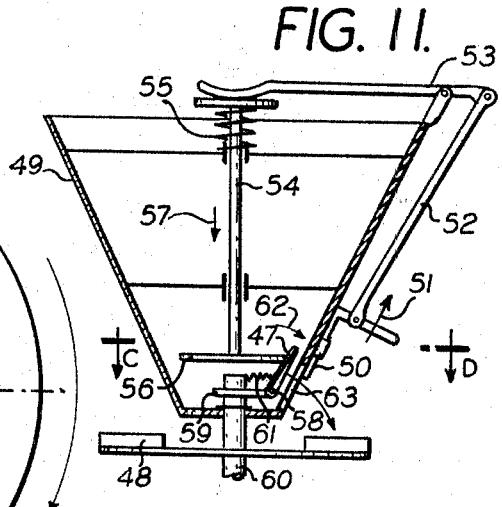
FIG. 11.
FIG. 12.
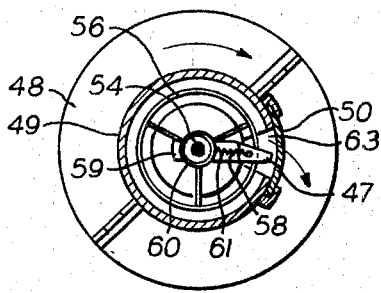
INVENTORS
HEINZ DREYER
ERNST HERBECK
BY
Burgess, Dinklage + Sprung
ATTORNEYS.

United States Patent Office 3,425,636
Patented Feb. 4, 1969

3,425,636
CENTRIFUGAL SPREADER APPARATUS
Heinz Dreyer, Gaste, Kreis Osnabruck, and Ernst Herbeck, Hage, Kreis Osnabruck, Germany, assignors to Amazonen-Werke H. Dreyer, Gaste, Kreis Osnabruck, Germany
Filed July 14, 1966, Ser. No. 565,182
Claims priority, application Germany, July 16, 1965,
A 49,756
U.S. Cl. 239—665           14 Claims
Int. Cl. A01c 15/00, 17/00

ABSTRACT OF THE DISCLOSURE

To reduce variation in the scattering of material, e.g. fertilizer, by a centrifugal disc spreader, as the rate of feed delivery to the spreader is varied, the area on the disc member on which the material is deposited is moved along a spiral path, as said rate of feed is varied. As the rate of feed increases, said area is moved over said path toward the outer periphery of the disc.

---

This invention relates in general to centrifugal spreader equipment, and more particularly to a centrifugal spreader apparatus for distributing granular materials and the like, especially fertilizers, in which the material flows from a hopper through one or more variable outlet openings onto one or more scattering members.

The essence of the present invention consists in controlling the rate of distribution of the materials by appropriately shifting the point of material feed to the scattering member so as to eliminate the so-called quantity effect that has long been experienced in practice, i.e. the simultaneous variation of the scattering width with variation in the flow rate of the same material. By eliminating this quantity effect, it becomes possible to furnish relatively simple instructions with each centrifugal spreader apparatus for adjusting it to provide a preselected spreading pattern width and orientation for various material grain sizes and flow rates.

In some prior art centrifugal spreader machines, there is no means provided for shifting the point of feed to the scattering means when the rate of feed is adjusted. Experiments have shown that, in such machines, for the same material, the scattering angle and hence the scattering width is enlarged as the rate of feed increases with a fixed feed area center on the scattering means. This results in the unfortunate disadvantage that, with such a machine, it is impossible to state in the operating constructions how to achieve a constant spreading width for different rates of feed of a particular material.

Centrifugal spreader machines are also known in which the feed to the scattering member, usually a rotating horizontal disc, is shifted outwardly with increasing rate of feed. In this case, tests have shown that, for a constant rate of feed, the scattering angle diminishes as soon as the point of feed to the surface of the scattering member is shifted outwardly. This illustrates that it would be possible to obtain a constant scattering width angle if the rate of feed is increased and the point of feed is simultaneously displaced outwardly in the proper proportion for the change in rate of feed. In this case, however, it has been found that merely displacing the point of feed outwardly on the scattering disc rarely if ever gives satisfactory performance because the angle between the bisector of the scattering pattern width angle and the horizontal transverse axis of the scattering disc varies. This horizontal transverse axis is essentially a reference line pointing in the direction in which the center of the scattering disc moves as the spreader apparatus travels over the land upon which the materials are to be distributed. Thus, the orientation of the scattering angle width bisector describes the principal direction of the scattering pattern relative to the direction of movement of the spreader apparatus, which is ordinarily carried on a wagon or some other appropriate vehicle. Due to this change in the direction of flight of the particles of material, the effective scattering width changes as the rate of feed increases, resulting in the disadvantages previously described.

Other spreader machines are known in which the point of feed moves on a circle concentric with the scattering member or tangentially thereto as the flow rate of material increases. In this case, as the rate of flow of material increases, the angle of scatter becomes greater or smaller according to the direction of rotation of the scattering member. At the same time, the position of the pattern angle bisector in relation to the horizontal transverse reference axis of the scattering member changes, resulting in substantially great changes in the width of spread when the rate of flow of the material is varied.

The centrifugal spreader apparatus of the instant invention is based upon experimental findings that the material can be fed to various points on a rotating scattering disc, where the size of the scattering width angle changes, but not the position of its bisector in relation to the transverse reference axis of the scattering disc. It has been found that for a particular bisector orientation, these points of constant bisector attitude lie upon a line running outwardly on the scattering disc in the direction of rotation.

On the basis of this knowledge, the present invention provides a centrifugal spreader apparatus wherein the outlet opening to which materials are fed onto the scattering disc has such a shape, and/or associated elements for controlling the rate of material flow therethrough, that the epicenter of each feed area on the scattering disc shifts, as the rate of flow of material increases, along a line that runs in the direction of rotation of the scattering disc and runs simultaneously outwards, such line being characterized in that the angle enclosed by the tangent at any point on the line and the horizontal transverse reference axis of the scattering disc is greater than 0° and smaller than 90°. With such an arrangement, the so-called quantity effect is virtually excluded, and consequently it becomes possible to state or specify for each material a width of spread that will remain approximately constant for any rate of flow of a particular material.

If it is desired to state or specify precisely a constant width of spread for any rate of flow of material, it is necessary according to the invention for the upper center of the feed area on the scattering disc to shift outwardly, when the rate of feed increases, on a spiral line running in the direction of rotation, such line being one of a family of line curves based on the aforementioned experimental findings.

The centrifugal spreader apparatus of the invention can be used for distributing various types of granular materials such as fertilizers and the like, and essentially comprises a hopper means, a rotatable horizontal disc member, and controllable outlet defining means associated with the hopper means. The hopper means is adapted to contain a supply of materials to be distributed and the disc member is disposed in underlying relation to the hopper means to receive materials discharged therefrom and rotates about a generally vertical axis to centrifugally scatter such received materials. The outlet defining means includes one or more members operatively connected to the hopper means to define an outlet for discharging materials therefrom onto a selected area of the scattering disc, and the outlet defining means is adjustable to selectively vary the flow rate of materials discharged from the hopper means and to selectively vary the position of the center of the feed area on the disc with respect to its axis of rotation so as to correspondingly regulate the angular width of the distribution pattern of materials scattered by the disc and the angular position of the bisector of such distribution pattern with respect to a predetermined direction line passing through the rotation axis of the disc.

In the operation of the centrifugal spreader apparatus of the invention, materials fed onto the rotating disc are centrifugally scattered therefrom in a horizontal distribution pattern which can be characterized in terms of an angular width dimension $\alpha$, and in terms of the orientation of the bisector of the pattern width angle $\alpha$ with respect to a reference radial line passing through the disc rotation center and extending in the direction in which the disc center moves as the spreader apparatus travels over the land area to be covered.

The distribution pattern orientation angle $\beta$ and the width or coverage angle $\alpha$ will in general depend upon the size of the material feed area on the disc, and the location of the epicenter of the feed area as measured radially with respect to the disc center and angularly with respect to the reference radial line pointing in the direction of travel.

For a fixed feed area center location, the distribution pattern direction angle $\beta$ will be constant regardless of the size of the feed area itself, and the pattern width angle $\alpha$ will vary with the size of the feed area, increasing as the feed area is enlarged for greater material flow rate, and decreasing as the feed area is diminished for reduced material flow rate.

In the various embodiments of the invention described hereinafter, various means are provided for shifting the feed area at the center along a path which results in a selected bisector orientation angle $\beta$. Because along such a constant bisector attitude path, the scatter angle $\alpha$ will vary with a given material feed rate, the invention provides means for regulating the feed rate either independently to achieve different scatter angles $\alpha$ along the shifting path, or in accordance with the position of the feed area epicenter along the shifting path so as to maintain a constant scatter angle $\alpha$ with different feed rates. The invention thus provides a centrifugal spreader apparatus whereby the three parameters, bisector orientation angle $\beta$, scatter angle $\alpha$, and material flow rate can be controllably regulated to achieve a desired combination of operating conditions.

The invention is by no means limited to a centrifugal spreader apparatus utilizing a single rotating scatter disc, but also is adaptable to embodiments wherein two or more rotating spreader discs are provided for greater spreading capability. In such embodiments, the feed area center position and the feed rate to each rotating disc are similarly controlled as in the case of the single disc embodiments so as to achieve desired operating conditions for such multiple discs, either individually or jointly.

It is therefore an object of the invention to provide a centrifugal spreader apparatus for distributing granular materials and the like, such as seed and fertilizer.

Another object of the invention is to provide a centrifugal spreader apparatus as aforesaid whereby the material scattering pattern can be controllably regulated.

A further object of the invention is to provide a centrifugal spreader apparatus as aforesaid whereby the principal direction of the scattering pattern can be maintained constant for various material flow rates and pattern angular width.

A further object of the invention is to provide a centrifugal spreader apparatus as aforesaid whereby a scattering pattern of constant principal direction and angular width can be maintained for various material flow rates.

A further object of the invention is to provide a centrifugal spreader apparatus as aforesaid featuring means for shifting the center of the area over which the material is fed onto a rotating scattering disc in accordance with the flow rate of such material onto the disc to achieve a scattering pattern having a selected principal direction and angular width.

A further object of the invention is to provide a centrifugal spreader apparatus as aforesaid wherein material is fed onto a plurality of individual rotating scattering discs at controlled areas thereupon to provide an augmented material distribution capability with control of the scattering patterns of each disc.

A further object of the invention is to provide a centrifugal spreader apparatus as aforesaid adapted for operation with gravity flow material feed to each scattering disc.

Still another and further object of the invention is to provide a centrifugal spreader apparatus as aforesaid adapted for operation where the material feed to each scattering disc is accomplished by mechanical ejection.

Other and further objects and advantages of the invention will become apparent from the following detailed description and accompanying drawings in which:

FIG. 1 is a schematic plan view illustration of a rotating disc of the type used in the centrifugal spreader apparatus of the invention for scattering materials to be distributed and showing a typical scatter pattern produced for a given material feed area on the disc with a given feed rate.

FIG. 2 is another schematic plan view of the scattering disc of FIG. 1, illustrating a typical scatter pattern produced for the same feed area center location as in FIG. 1, but with an increased feed rate.

FIG. 3 is a further schematic plan view of the scattering disc of FIG. 1, illustrating a typical family of paths over which the feed area center can be shifted to maintain scatter patterns of constant principal direction.

FIG. 4 is a schematic plan view, looking downward, of a centrifugal spreader apparatus according to a preferred embodiment of the invention in which the outlet opening in the hopper bottom extends spirally outward and the position of the feed area center on the scattering disc is controlled by an adjustable slide.

FIG. 5 is a schematic plan view, looking downward, of a centrifugal spreader apparatus according to another embodiment of the invention wherein the feed control slide is shaped to increase the material flow rate to the scattering disc as such slide is positioned to shift the feed area center outwardly along a spiral path across the disc.

FIG. 6 is a schematic side elevation view of a centrifugal spreader apparatus according to a further embodiment of the invention wherein the bottom edge of the outlet opening, situated in the side wall of the hopper, ascends in the direction of rotation of the scattering disc.

FIG. 7 is an elevation view, partly in section, of the centrifugal spreader apparatus shown in FIG. 6.

FIG. 8 is an elevation view of a centrifugal spreader apparatus according to a further embodiment of the invention featuring a pair of rotating scattering discs individually supplied by a dual outlet hopper and wherein the material fed to the discs is by means of mechanical ejection from the hopper.

FIG. 9 is a plan view of a portion of the centrifugal spreader apparatus of FIG. 8 as seen on a section taken along line A–B therein.

FIG. 10 is an elevation view of a centrifugal spreader apparatus according to a further embodiment of the invention featuring a chute which is shifted simultaneously with the feed control slide to regulate the location of the feed area center on the scattering disc.

FIG. 11 is an elevation view, partly in section, of a centrifugal spreader apparatus according to a further embodiment of the invention featuring a mechanically driven feeding member the operation of which is controlled simultaneously with a feed control slide.

FIG. 12 is a plan view of a portion of the centrifugal spreader apparatus of FIG. 11 as viewed at the section C–D therein.

As is shown schematically in FIGS. 1 and 2, it has been found on the basis of experiments that, if the material (not shown) is fed at the same point 1 on the scattering disc 2, as the rate of material flow increases, and with it the size of the feed areas 3 and 3′, the angles of scatter $\alpha 1$ and $\alpha 2$ respectively associated with the feed areas 3 and 3′, and hence the spreading angular width, increases. The position of the bisector 4 of the scatter width angles $\alpha 1$ and $\alpha 2$, which can be considered as the principal direction of the material scatter pattern produced by the disc 2, remains constant. The bisector 4 intersects a horizontal reference line 5 at an included angle $\beta$, which remains constant for feed areas 3 and 3′ centered on the same point 1 regardless of the size of such feed areas 3, 3′ and hence independently of the material feed rate to the disc 2. The horizontal reference line 5 can be generally considered as being a transverse axis of the scattering disc 2 fixed in space even though the disc 2 rotates, and pointing in the direction in which the center of the disc 2 moves as the spreader apparatus travels over the land upon which the material is to be scattered. It should be noted that what is desired is to control the orientation angle of the scatter pattern with respect to some fixed reference line, which is expediently the direction in which the spreader apparatus travels, but can be any other selected reference line (not shown). Normally, the spreader apparatus will be carried by a wagon or some other vehicle (not shown) rather than operated in a stationary position, and the orientation of the scatter pattern, as for example, given by the angle $\beta$ is of significance because it is generally intended that the scatter pattern be directed transversely, not necessarily at right angles to the travel path, or sometimes backwardly, but in any case, the scatter pattern orientation angle $\beta$ is to be directed so that the material does not strike the carrying vehicle.

For a fixed feed area center location 1, the distribution pattern direction angle $\beta$ will be constant, but the pattern width angle will vary with the size of the feed area 3, 3′, increasing as the feed area is enlarged for greater material flow rate, and decreasing as the feed area is diminished for reduced material flow rate. This phenomenon is shown in FIGS. 1 and 2 wherein the feed area 3 of FIG. 1 results in a scatter angle $\alpha 1$ which is smaller than the scatter angle $\alpha 2$ for the larger feed area 3′ shown in FIG. 2.

Further experiments have shown that, on a scattering disc 2 there are a plurality of feed points 6, 7, 8, 6′, 7′, 8′, 6″, 7″, 8″, in which the position of the angle bisector 4, and hence of the angle $\beta$, remains constant. These points 6–8″ are located for each particular angle $\beta$, on lines 9, 10 and 11, which run spirally outward in the direction of rotation of the scattering disc 2. This family of lines 9, 10 and 11 are characterized in that all tangents 12, 12′, drawn to points on the lines 9, 10 and 11, form with the reference line 5 an intersection angle $\gamma 1$, $\gamma 2$, which is greater than 0° and smaller than 90°. However, if the angle $\beta$ is held constant, while the rate of flow of the material is also constant, the angle of scatter $\alpha 1$, $\alpha 2$, changes, namely it becomes smaller as the points of feed 6–8″ are shifted outwardly on lines 9, 10 and 11, as shown in FIG. 3.

In order to prevent the disadvantageous enlargement of the scatter angle as the material flow rate increases, the two phenomena determined on the basis of experiments are utilized to compensate each other by shifting the feed points 6–8″ outward in the direction of rotation along lines 9, 10 and 11 respectively as the rate of flow increases.

How such shifting can be performed in practice is described in further detail in the following examples.

In the spreader apparatus represented in FIG. 4, there is located in the bottom 13 of a hopper 14 an outlet opening 15 which has a shape running outwardly in the direction of rotation of the scattering member 16. The outlet opening 13 is closed by means of the outlet control slide 17, which can be locked in several positions along a setting bar 18. If the outlet slide 17 is turned in the direction of the arrow 19, the outlet opening 15 is opened, thereby shifting the point of feed on the scattering member 16 outwardly in the direction of rotation.

In the centrifugal spreader apparatus represented in FIG. 5, the epicenter or center of the feed area on the scattering disc 20 is shifted outwardly in the direction of rotation by turning the outlet slot 21 in the outlet slide 22 in the direction of the arrow 23, to points beneath the outlet opening 24 in the hopper floor 25.

FIGS. 6 and 7 show a centrifugal spreader apparatus in which the outlet openings 26 are located in the side wall of the hopper 27. The bottom edge 28 of the outlet opening 26 ascends in the direction of rotation of the scattering disc 29. If the outlet slide 30 is turned in the direction of the arrow 31, a larger outlet gap is opened. At the same time, the point of material issue from the hopper 27 shifts upwardly thereby shifting the center of the feed area on the scattering disc 29 outwardly in the direction of rotation along a straight line path which approximates a spiral path having the characteristics of the lines 9, 10 and 11.

FIGS. 8 and 9 represent a centrifugal spreader apparatus having two scattering discs 33 and 33′, in which the material is thrown by means of rotation feed members 34 through the outlet openings 35 against bounce plates 36, 36′. These bounce plates 36, 36′ are disposed slantwise in relation to the reference line 37 joining the centers of the scattering discs 33, 33′, so that, when the outlet slides 38, 38′, are opened, the centers of the feed areas on the scattering discs 33, 33′, shift outwardly in the direction of their respective rotations. Preferably, the scattering discs 33 and 33′ are counterrotated, and for convenience are connected to their associated feed members 34 by means of shafts S so that said feed members 34 may be driven by the discs 33, 33′.

In the centrifugal spreader apparatus shown in FIG. 10, a chute 40 is provided beneath the outlet opening 39, in such a manner as to pivot about a horizontal axis 41 and about a vertical axis 42 on the hopper 43. The chute 40 is also linked to a flow control slide 45 by a cable 44. When the flow control slide 45 is operated to uncover the outlet opening 39, the chute 40 is simultaneously swung about and lifted, thereby shifting the center of the feed area outwardly in the direction of rotation on the scattering disc 46.

In FIGS. 11 and 12, there is represented a centrifugal scattering apparatus in which the material is hurled by means of an adjustable feeding member 47 in the direction of rotation of the scattering disc 48, out of the hopper 49. When the flow control slide 50 is opened in the direction of the arrow 51, an adjusting ring 56 is moved in the direction of arrow 57 by means of two levers 52 and 53 and a push rod 54 against the pressure of a spring 55. In this manner, the feeding member 47, which is mounted on a plate 59 so as to pivot about an axis 58 and be driven by a shaft 60 during operation, is swung against the tension of a spring 61 in the direction of the arrow 62. Due to a changed position of the feeding member 47 in relation to the outlet opening 63, the material is flung further outward, thereby shifting the center of the feed area on the scattering disc 48 outwardly in the direction of rotation thereof.

As can be appreciated from the foregoing, the centrifugal spreader apparatus of the invention throughout its several embodiments includes a hopper means adapted to contain a supply of the materials to be distributed, such as exemplified by the hoppers 14, 27, 43 and 49, and a generally horizontal disc member disposed in underlying relation to the hopper means to receive materials discharged therefrom, and disposed for rotation about a generally vertical axis to centrifugally scatter said received materials, such as represented by the disc scattering members 16, 20, 29, 33, 33', 46, and 48. In general, the invention provides means operatively connected to the hopper means to define an outlet for discharging the materials onto a selected area of the disc member, and this outlet defining means is adjustable to selectively vary the flow rate of materials discharged from the hopper means and to vary the position of the feed area center on the disc member with respect to its axis of rotation for the purpose of correspondingly regulating the angular width of the material distribution pattern and the orientation of the pattern bisector.

The outlet defining means is adjustable to position the center of the material feed area on the disc along a spiral path extending outwardly in the direction of its rotation to achieve the end of maintaining a material distribution pattern having a substantially constant bisector orientation, and to achieve a constant pattern width, the outlet defining means is adjustable to vary the material flow rate to the disc in accordance with the position of the material feed area center thereupon, so as to compensate for the interrelated variation between material flow rate and pattern angular width along shifting paths of constant bisector orientation. By increasing the material flow rate to the disc as the feed area center is shifted outwardly along such spiral path, a material distribution pattern of constant angular width and constant bisector orientation can be maintained for various material flow rates.

In the embodiment of the invention represented by FIG. 4, the outlet defining means can be considered as including the hopper bottom member 13 which has the spiral outlet slot 15 and the slide member 17 which is disposed for movement relative to the slot 15 to uncover selected portions thereof for directing the flow of materials discharged from the hopper 14 onto a corresponding feed area of the disc 16 so as to shift the center of the feed area along a spiral path corresponding to the spiral contour of the outlet slot 15.

In the embodiment shown in FIG. 5, the outlet defining means again includes a slide member 22, a hopper bottom 25 having an outlet opening 24, but in this case, the slide member 22 also has a slot 21 which can be positioned into at least partial registry with the outlet aperture 24 in hopper bottom 25 for regulating the flow rate of materials discharged from the hopper and shifting the feed area center along a spiral path corresponding to the spiral outlet slot 21 in the slide member 22.

FIGS. 6 and 7 illustrate a further embodiment of the invention wherein the outlet defining means includes the upwardly inclined wall of the hopper 27 with the outlet aperture 26, and the slide member 30. In this embodiment, it should be noted that with an outlet slot 26 on the side wall of the hopper 27, a feed member X is preferably provided within the hopper 27 for rotation therein so as to eject material therefrom through the outlet 26.

FIGS. 8 and 9 exemplify how the basic principles of the invention can be applied to create a multiple scattering disc spreader apparatus. The same basic principles of material flow rate regulation in accordance with the shifting of the feed area center position along an outward spiral path are applicable to the feeding of materials to the disc 33 and 33' through the outlet openings 35 uncovered by the outlet slides 38, 38' corresponding to discs 33 and 33' respectively. In this particular embodiment, mechanical ejection of the material from the hopper means is provided by the rotating feed members 34, and therefore the bounce plates 36, 36' can be expediently used to direct the material onto the intended feed areas on the disc 33, 33'.

In FIG. 10, the generalized outlet defining means includes the combination of the outlet opening 39 in hopper 43, the chute 40, and the flow control slide 45 and its associated cable 44 connecting it for operation in conjunction with the chute 40.

FIGS. 11 and 12 exemplify an embodiment of the invention in some respects similar to that exemplified by FIGS. 6 and 7, in that the material is discharged from the side wall slot 63 of the hopper 49 by a rotating feed member 47, and by the fact that the effective opening of the hopper outlet 63 is controlled by a slide 50. However, in FIGS. 11 and 12, the feed member 47 is an adjustable configuration feed member which is connected to the slide means for configuration adjustment thereby in accordance with the effective opening of the outlet 63.

From the foregoing, it will be apparent to the artisan that the invention is susceptible of numerous variations and modifications to suit the needs of a particular application. However, the invention is intended to be limited only by the following claims in which I have endeavored to claim all inherent novelty.

What is claimed is:

1. A centrifugal spreader apparatus for distributing granular materials and the like, which comprises a hopper means adapted to contain a supply of such materials to be distributed, a generally horizontal disc member disposed in underlying relation to said hopper means to receive materials discharged therefrom, and disposed for rotation about a generally vertical axis to centrifugally scatter said received materials, and means operatively connected to said hopper means to define an outlet for discharging said materials therefrom onto a selected area of said disc member, said outlet defining means being adjustable to selectively vary the flow rate of materials discharged from the hopper means and to selectively vary the position of the center of said area on the disc member along a spiral path extending in the direction of rotation of the disc member and radially outwardly of the axis of rotation of the disc member to permit reducing variation in the angular width of the distribution pattern of material scattered by said disc member and the angular position of the bisector of said distribution pattern with respect to a predetermined reference direction line passing through the rotation axis of the disc member, upon variation of the flow rate of material discharged from the hopper.

2. The centrifugal spreader apparatus according to claim 1 wherein said outlet defining means is adjustable to maintain a material distribution pattern having a substantially constant bisector angular orientation with respect to said reference direction line.

3. The centrifugal spreader apparatus according to claim 2 further characterized in that the tangents to each point on said spiral path intersect with said reference line at angles which vary from each other less than 90 degrees.

4. The centrifugal spreader apparatus according to claim 3 wherein said outlet defining means is adjustable to vary the material flow rate to said disc in accordance with the position of the material feed area center thereupon established by said outlet defining means.

5. The centrifugal spreader apparatus according to claim 4 wherein said outlet defining means is adjustable to increase the material flow rate to said disc as it shifts the feed area center outwardly along said spiral path to maintain a material distribution pattern of constant angular width.

6. The centrifugal spreader apparatus according to claim 4 wherein said outlet defining means includes a hopper bottom member having an outlet slot extending spirally outward in the direction of disc rotation, and a slide member disposed for movement relative to said slot to uncover selected portions thereof for directing the flow of materials discharged from the hopper means therethrough onto a corresponding feed area of the disc and to thereby shift the center of said feed area along a spiral path corresponding to said spiral outlet slot.

7. The centrifugal spreader apparatus according to claim 4 wherein said outlet defining means includes a hopper bottom member having an outlet aperture, and a slide member having an outlet slot of generally spiral contour extending outwardly in the direction of disc rotation, said slide member being disposed for movement relative to the hopper bottom member to position the outlet slot of said slide member in at least partial registry with the outlet aperture of the hopper bottom to regulate the flow rate of materials discharged from the hopper means onto a feed area of the disc, and to shift the center of said feed area along a spiral path corresponding to the spiral outlet slot in said slide member.

8. The centrifugal spreader apparatus according to claim 4 wherein said outlet defining means includes an upwardly inclined hopper wall having an outlet aperture, the bottom edge of which rises upwardly slantwise in the direction of disc rotation, and a slide member disposed for movement across said outlet aperture to selectively uncover portions thereof to correspondingly vary the flow rate therethrough of material discharged from the hopper means onto a feed area of the disc, and to shift the center of said feed area along a spiral path corresponding to said outlet aperture.

9. The centrifugal spreader apparatus according to claim 8 including a feed member disposed within the hopper means for rotation relative thereto to eject material therefrom through said outlet aperture.

10. The centrifugal spreader apparatus according to claim 4 including a pair of generally horizontal disc members disposed in underlying relation to said hopper means each to receive materials discharged therefrom, and disposed for rotation about respective generally vertical axes to centrifugally scatter said received materials, and including means operatively connected to said hopper means to define a pair of outlets for discharging said materials from the hopper means therethrough onto selected feed areas on corresponding disc members, said outlet defining means being adjustable to vary the flow rate of materials through each outlet and to selectively vary the position of the center of each feed area along similar spiral paths extending outwardly in the rotation direction of each disc member to correspondingly regulate the angular width of the distribution pattern of materials scattered by each disc member and the angular position of the bisector of each material distribution pattern with respect to a reference line joining the centers of rotation of said disc members.

11. The centrifugal spreader apparatus according to claim 10 including a pair of feed members disposed within said hopper means for rotation relative thereto to eject material therefrom through each of said outlets.

12. The centrifugal spreader apparatus according to claim 11 including a pair of inclined bounce wall members extending outwardly from the hopper means, one bounce wall being disposed in front of each outlet to direct material ejected therethrough onto a selected feed area of the disc associated with said outlet, said bounce wall members being each inclined with respect to said reference line at an angle greater than zero degrees and less than 90 degrees.

13. The centrifugal spreader apparatus according to claim 4 wherein said outlet defining means includes means defining an aperture in the lower portion of the hopper means to accommodate the discharge of material therefrom by gravity flow, and a chute member disposed in underlying relation to said aperture to receive materials discharged therethrough, and disposed in overlying relation to said disc to deliver said materials thereto, said chute member being adjustable to deliver said received materials onto a selected feed area of the disc centered along such spiral path.

14. The centrifugal spreader apparatus according to claim 4 wherein said outlet defining means includes means defining an aperture in the lower portion of the hopper means and an adjustable means including a slide member disposed for movement across said aperture to uncover selected portions thereof to regulate the flow rate of materials therethrough, and including a feed member disposed within said hopper means for rotation relative thereto to eject said material through said aperture, said feed member having a movable portion disposed for engagement by said slide means to vary the effective configuration of the feed member for correspondingly regulating the flow rate of material ejected thereby in accordance with the effective aperture area uncovered by the slide member of said slide means to direct the material ejected onto a selected feed area on the disc centered along such spiral path.

References Cited

UNITED STATES PATENTS

| 1,058,468 | 4/1913  | Ruhland | 239—666 |
| 2,334,376 | 11/1943 | Bauer   | 239—666 |
| 2,723,860 | 11/1955 | Weeks   | 239—665 |
| 3,109,657 | 11/1963 | Dreyer  | 239—665 |

EVERETT W. KIRBY, *Primary Examiner.*

U.S. Cl. X.R.

239—687